Patented Mar. 5, 1940

2,192,866

UNITED STATES PATENT OFFICE 2,192,866

TREATMENT OF MINERAL OIL

Sidney Musher, New York, N. Y., assignor to Musher Foundation Incorporated, New York, N. Y., a corporation of New York No Drawing. Application June 17, 1939, Serial No. 279,675

6 Claims. (Cl. 167—66)

This invention relates to the treatment of mineral oil in order to retard oxidative deterioration thereof and to develop new and pleasing flavor and odor characteristics in it whereby it is made more readily acceptable and usable.

Among the objects of the present invention is the development of desirable flavors and aromas in the mineral oil so that when used for normal laxative and other purposes it will be more readily acceptable and have greater value.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

Refined white mineral oil is odorless and flavorless when freshly made but, within a relatively short period, reverts to an objectionable crude odor and flavor, particularly when exposed to air and light.

Moreover, the mineral oil of commerce is objectionable to many people because it is lacking in "character" and even in its fresh substantially odorless and flavorless condition is objectionable.

It has now been found possible to improve such mineral oils in quality, flavor and stability by introducing very small amounts of the mineral oil soluble constituents of dehydrated, macerated olives.

It has been found desirable to prepare the olive flesh before treatment with the mineral oil to introduce said constituents so that no undesirable flavors or odors will be transmitted into the mineral oil.

Moreover, it is desirable to process the olive material in such a way that the odor and flavor characteristics may be transmitted into the mineral oil by the infusion process to give unusual flavoring and odorous characteristics to the infused oil which characteristics differ substantially from the flavor and odor of ordinary expressed olive oil and which flavor and odor of the infused oil are much more pleasing and desirable than the characteristic flavor and odor of ordinary olive oil as obtained by the usual commercial procedure.

In preparing the olives for infusion, they are picked desirably when fully ripe and before any fermentation has set in. The olives may be in their slightly pre-ripe condition, but this is generally considered undesirable and it is preferable for the olives to be substantially in ripe form.

Immediately after the olives have been picked, they should desirably be packed with from 25% to 100% and preferably about 50% of their total weight of common salt by alternating layers of salt and olives. At regular intervals ranging from one to three days, the brine produced is poured off and the salting allowed to continue until the total moisture content of the olives is 30% or less and preferably under 25%. This will require from 15 to 35 days and the olives will contain from 5% to 10% of salt.

This dehydration is highly desirable and the salting down treatment appears definitely to enhance the value of the olives for the subsequent infusion process.

Where the olives are not salted in the aforesaid manner or where they are only lightly salted after picking, such as where from 3% to 10% of salt is sprinkled over the olives, these olives may be subjected to other dehydrating operations.

For example, the olives may be placed in a revolving drum and dried preferably under reduced pressure. Where desired, the drying may take place at atmospheric pressure and it has even been observed that where the olives are dried by allowing a stream of hot air to flow through them, the pro-vitamin A or carotene content of the olive is substantially retained to be passed on to the mineral oil by this infusion process.

Where the olives are dried at atmospheric pressure, the olives are placed into a revolving drum containing paddles and, while the drum is revolving, a stream of heated air having a temperature of between 1000° F. and 1600° F. enters one end of the cylinder and passes out the other end of the cylinder at a temperature of about 240° F. to 275° F. When the olives have reached the desired point of dryness of under 20% moisture, they are removed from such chamber.

Another method that may be utilized for the drying of the olives is to expose them to the direct heat of the sun provided sufficient sunshine is available for the olives to be dried in the sun before any fermentation sets in. If there is any question of fermentation, the olives may be lightly dusted with salt and then exposed in open trays to the sun until they are reduced to a substantial state of dryness and have no more than approximately 20% to 30% total moisture present.

The salted olives may be further dried from 30% moisture to under 20% moisture by the mechanical drying or sun drying procedures referred to above.

The salting operation may be omitted only when the olives are dried within 20 to 20 hours after picking but for a better preservation of the flavoring constituents of the olive to be available for infusion purposes, the salting operation should be employed and the olives used for infusion should desirably contain 5% and preferably about 8% total salt.

It may in some cases be desirable to immerse the olives immediately after picking and before the brining or salting in a 1% to 2% soda lye solution for from a few minutes to several hours and then to wash the olives in water several times to remove the lye from them. As a result of the lye treatment, some of the bitter principles of the olive will also be removed leaving an olive that will impart to the mineral oil by this infusion process a distinctive flavor and odor.

The olives may, where desired, be immersed into mineral or a glyceride oil in order to soften the tissues and fleshy portions of the olive. The immersion of the olives into the oil should take place after the olives have been dried and the olives may be allowed to remain soaking in the oil for a period ranging from fifteen minutes to forty-eight hours, and then removed from such oil bath.

Where desired, the olives when freshly picked or after drying, may be subjected to a depulping or depitting operation, whereby their pits are removed. This is accomplished either by hand or machine operation, the pits being utilized for grinding and for use in cattle or other animal feed or for additional infusion purposes. In accordance with this invention, however, it is most preferable to use the entire olive, but the depitted or depulped olive may also be employed.

The dried olive containing under 30% and desirably under 20% of total moisture is then macerated and ground to a fine paste. This is best accomplished by first adding the olive to a grinding machine which pulverizes the pits and also breaks into the fleshy portion. Where the pits were previously removed, such a grinding is not required.

The olives are then subjected to a stone or iron rolling or colloid mill treatment. For example, they may be allowed to pass between stone rollers, the upper roll operating at a different speed than the lower roll in order to finely mill and divide the olive into a pasty form. Desirably the olives are subjected to a colloid mill treatment whereby the fine paste is produced.

The paste should be so completely ground that when rubbed between the fingers, the individual particles of the olive can no longer be felt but will be perfectly smooth to the touch.

Where desired, there may be added to the olive before or during the final operation of producing the paste a small quantity, preferably less than 50% against the weight of the olive, of an added oil and preferably of the mineral oil with which the olive paste is subsequently to be used. For example, to the olives may be added a small amount of mineral oil and then put through the colloid mill in order to form a thinner, more free flowing paste.

During this macerating or grinding process, the temperature should desirably not exceed about 212° F. in order to avoid any burning or scorching of the olives. Where the olive paste is insufficiently dried, it may be further subjected to a drying operation by exposing to a draft of heated air while kept in agitation or by heating under reduced pressure. The olive paste is then ready for addition to and infusion in the mineral oil.

In the treatment of the mineral oil the olive paste, prepared as indicated above, is added to and thoroughly dispersed in the oil in an amount of less than 20% and desirably in an amount of 7% or less. As little as 0.5% up to 5% will give highly desirable results.

The olive paste is mixed thoroughly throughout the body of the oil and preferably while the oil is at a slightly elevated temperature or such as at about 160° F. to 200° F. and desirably at about 175° F. The oil containing the olive paste is agitated for a short period of time ranging from one minute to several hours and then the undesired solids of the olive are removed by centrifuging, filtration or similar means.

It is particularly desirable where possible for the oil containing the olive paste thoroughly dispersed therein to be put through a colloid mill in order to completely contact the individual particles of the olive with the mineral oil. In other words, the oil containing the olive paste is well agitated at the slightly elevated temperature and passed through the colloid mill. Under these conditions the oil does not subsequently require any further time period for the olive paste to remain in contact with that oil but the oil may then be subjected to immediate filtration, centrifuging, or other treatment to remove the undesired solids.

It is not desirable for the olive paste to be treated in a large amount with the mineral oil such as when using for example 50% of olive paste and 50% of refined white mineral oil and with the olive paste solids then filtered from the oil, mixing that oil with a larger lot of mineral oil. When this procedure is followed, the full antioxidant and desirable flavoring and odorous constituents of the olive are not developed in the mineral oil undergoing treatment. The most desirable procedure is for the olives to be added to and mixed in the mineral oil in an amount of less than about 20% and desirably less than about 7% and then to filter the undesired olive solids from the entire body of the oil.

When, for example, a refined white mineral oil is treated in accordance with this invention with say 5% of an olive paste prepared in the manner indicated above, the mixture of the olive paste and the oil having been carried out at about 175° F. for 15 minutes and then with the undesired solids removed by filtration, the resultant oil has entirely new characteristics from a standpoint of odor and taste and is even superior to a fine, natural olive oil even though the cost of the infusion treatment is negligible.

In addition, the refined white mineral oil is materially improved in keeping quality and it is frequently possible to extend the life of the mineral oil by two or three times when utilizing this process.

These results are not obtainable by a mere mixing process of ordinary expressed olive oil with mineral oil because there is only a certain amount of flavor that can be removed when the olive is normally expressed. In accordance with this invention, however, the macerated olive paste may be utilized in the treatment of mineral oil in order to develop much stronger and more concentrated and different odor and flavor characteristics in it and also to improve its keeping quality.

The high moisture containing olive in its original and natural condition is not capable of treatment in accordance with this invention. Where the original undried olive is ground to a paste and where that paste is then added to and mixed in the mineral oil, said oil does not take on the desirable flavor and aromatic and other characteristics of the olive which are obtained when the olive is processed in the manner indicated above by first drying and then infusing the substantially low moisture paste in the oil.

The residue obtained following the filtration or centrifuging of the mineral oil from the olive paste, may desirably be utilized for hydraulic or expeller expression in order to remove substantially all of the oil still remaining therein. The residue may then be ground to a flour and employed for cattle food or other animal food purposes, or because of its highly acceptable nature, may be utilized in special medicinal or food products as for laxative purposes, or for alcoholic extraction to remove cathartic or laxative principles which alcoholic extract may be used in medicinal emulsions as in petroleum or mineral oil emulsions for direct addition to mineral or glyceride oils, etc.

The residue of olive solids that is obtained following the first infusion with the mineral oil may be employed a second time although it is one of the features of this treatment that when the olive paste is infused in accordance with this invention, substantially all of the flavor, odor and other properties are removed therefrom so that very little if any thing is left behind to be available for a second infusing operation.

Where increased antioxidant action is required, mineral oil containing the olive macerated paste is subjected to an elevated temperature of from 200° F. to 300° F. and even as high as 400° F. to 450° F. whereby much more marked antioxidant properties are developed. There is no explanation as to why the antioxidant action becomes so much more pronounced at the elevated temperature whereby the higher the heat treatment, the greater the antioxidant effect obtained.

In accordance with this invention, however, the most desirable temperature from the standpoint of retaining the full characteristics of the olive and imparting the full desirable characteristics to the mineral oil in a way in which it cannot be imparted in any other manner, is to heat the olive paste and the mineral oil to a temperature of no more than about 175° F. or ranging from 150° F. to 200° F.

It has furthermore surprisingly been found that where the olive is expressed to remove the major portion of the olive oil contained therein and that olive oil then mixed in refined white mineral oil using a large proportion of the olive oil such as 35% of the olive oil and 65% of the mineral oil, the flavor and odor characteristics of that mixture are by no means comparable to the results obtained by, for example, admixing 10% of dehydrated olive paste with refined mineral oil and with the undissolved solids filtered therefrom. The latter infused mineral oil will be a substantially superior product from the standpoint of odor, flavor and other properties in comparison with the former mixture of the olive oil and the mineral oil.

The olive cake remaining after the expression of the olive oil in the production of olive oil may less desirably be utilized for drying, grinding, macerating, and infusing in the aforesaid manner in mineral oil to develop desirable characteristics therein, but the most desirable characteristics are obtained by the use of the unexpressed olive.

Where the whole olive is salted or brined, the salt appears to enhance the desirable flavor and odor characteristics of the mineral oil with which the salted, dehydrated, macerated olive is infused, although it is normally to be expected that the salt as an oil insoluble material would have no effect.

The mineral oil infused in the aforesaid manner may desirably be utilized in the production of mineral oil emulsions as with agar, phenolphthalein, etc., and the infusion process will impart to the mineral oil emulsion highly desirable flavor and odor characteristics not otherwise obtainable.

Having described my invention, what I claim is:

1. A novel mineral oil composition containing a small amount of the mineral oil soluble constituents derived from a dehydrated, low moisture containing, salted, macerated olive paste, the oil being substantially free of the fibres of said olive paste.

2. A novel mineral oil composition containing a small amount of the mineral oil soluble constituents derived from macerated low moisture containing olives, the oil being substantially free of the fibres of said olives.

3. A mineral oil emulsion having desirable flavor characteristics containing a small amount of the mineral oil soluble constituents derived from a dehydrated, salted, low moisture containing macerated olive paste, the oil being substantially free of the fibres of said olive paste.

4. The method of treating mineral oil which comprises infusing said oil at a temperature of about 175° F. with a small amount, less than 10%, of a dehydrated, macerated olive paste for a short period and then removing the paste solids therefrom.

5. A method of making a mineral oil composition having desirable flavor characteristics which comprises mixing macerated dehydrated olive flesh with mineral oil and then removing the insoluble fibrous residues.

6. A novel mineral oil composition containing a small amount of the mineral oil soluble constituents derived from expressed, finely divided, low moisture containing olives, the oil being substantially free of the fibres of said olives.

SIDNEY MUSHER.